(12) United States Patent
Becker et al.

(10) Patent No.: US 9,291,219 B2
(45) Date of Patent: Mar. 22, 2016

(54) BOLT GUIDING DEVICE FOR A FLOATING CALIPER DISC BRAKE AND CORRESPONDING FLOATING CALIPER DISC BRAKE

(75) Inventors: Marco Becker, Oberdürenbach (DE); Guido Zenzen, Macken (DE); Nong Dang, Koblenz (DE); Dirk Hees, Kürrenberg (DE); Georg Brand, Nachtsheim (DE); Dirk Debus, Dachsenhausen (DE)

(73) Assignee: Lucas Automotive GmbH, Koblenz (DE)

( * ) Notice: Subject to any disclaimer, the term of this patent is extended or adjusted under 35 U.S.C. 154(b) by 2 days.

(21) Appl. No.: 14/111,818

(22) PCT Filed: Apr. 5, 2012

(86) PCT No.: PCT/EP2012/001527
§ 371 (c)(1),
(2), (4) Date: Dec. 20, 2013

(87) PCT Pub. No.: WO2012/139739
PCT Pub. Date: Oct. 18, 2012

(65) Prior Publication Data
US 2014/0110198 A1    Apr. 24, 2014

(30) Foreign Application Priority Data

Apr. 15, 2011  (DE) .......................... 10 2011 017 220

(51) Int. Cl.
*F16D 65/14* (2006.01)
*F16D 55/2265* (2006.01)
*F16D 55/227* (2006.01)

(52) U.S. Cl.
CPC .......... *F16D 55/2265* (2013.01); *F16D 55/227* (2013.01); *F16D 55/22655* (2013.01)

(58) Field of Classification Search
CPC ...... F16D 55/22655; F16F 1/36; F16F 1/373; F16F 1/3732; F16F 1/38; F16F 1/3835

USPC ........................................... 188/73.44, 73.45
See application file for complete search history.

(56) References Cited

U.S. PATENT DOCUMENTS 4,678,064 A * 7/1987 Adachi et al. ............... 188/73.45
5,927,446 A * 7/1999 Evans ........................ 188/73.44
(Continued)

FOREIGN PATENT DOCUMENTS

DE     2647911  A1   10/1977
DE     2211429  C3   10/1984
(Continued)

OTHER PUBLICATIONS

English-language abstract of JP 57-157382 (1982).*
(Continued)

*Primary Examiner* — Nicholas J Lane
(74) *Attorney, Agent, or Firm* — MacMillan, Sobanski & Todd, LLC

(57) ABSTRACT

A bolt guiding device for a floating caliper disc brake, having at least one guide bolt that is supported in a brake carrier and mounted on a brake caliper, wherein the brake caliper is movably guided over the guide bolt in the axial direction thereof. The bolt guiding device comprises a slide bush, wherein one surface of the inner circumferential surface and outer circumferential surface acts as a retaining surface on which the slide bush is retained, and wherein the other surface of the inner circumferential surface and outer circumferential surface acts as a sliding surface on which the slide bush slides. For this purpose, the slide bush has, facing the sliding surface, at least one guiding surface on each side of the center of the slide bush and at least one intermediate surface extending in the circumferential direction on each side of the center of the slide bush, wherein the diameter of the at least one guiding surface is dimensioned in such a way that said guiding surface is in close contact with the sliding surface, and wherein the diameter of the intermediate surface is dimensioned in such a way that said intermediate surface is provided in direct contact with or with a slight radial spacing from the sliding surface.

15 Claims, 3 Drawing Sheets

(56) References Cited

U.S. PATENT DOCUMENTS

| | | | |
|---|---|---|---|
| 8,220,596 | B2 | 7/2012 | Fischer et al. |
| 2008/0029356 | A1 | 2/2008 | Halasy-Wimmer et al. |
| 2010/0282547 | A1* | 11/2010 | Fischer et al. ............... 188/71.1 |
| 2011/0284332 | A1* | 11/2011 | Champion et al. ......... 188/73.45 |

FOREIGN PATENT DOCUMENTS

| | | |
|---|---|---|
| DE | 3323736 A1 | 1/1985 |
| DE | 3324385 A1 | 1/1985 |
| DE | 3903744 A1 | 8/1990 |
| DE | 10004178 A1 | 5/2001 |
| DE | 10245027 A1 | 4/2004 |
| DE | 10341095 A1 | 4/2005 |
| DE | 102006053183 A1 | 5/2008 |
| DE | 102007053902 A1 | 5/2009 |
| JP | 57157832 A * 9/1982 ............ F16D 55/224 |
| WO | 2004038249 A1 | 5/2004 |
| WO | 2005124179 A1 | 12/2005 |
| WO | 2010054918 A1 | 5/2010 |

OTHER PUBLICATIONS

International Search Report for International Application No. PCT/EP2012/001527 dated Jul. 12, 2012.

* cited by examiner

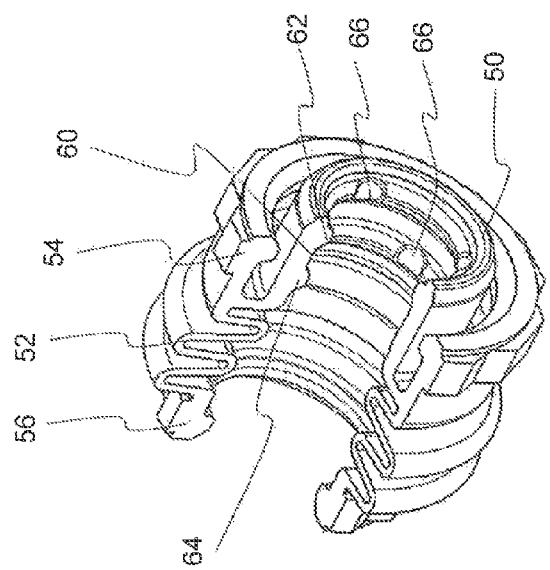
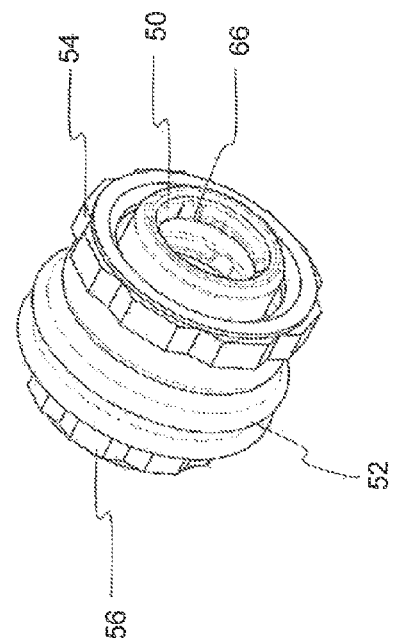
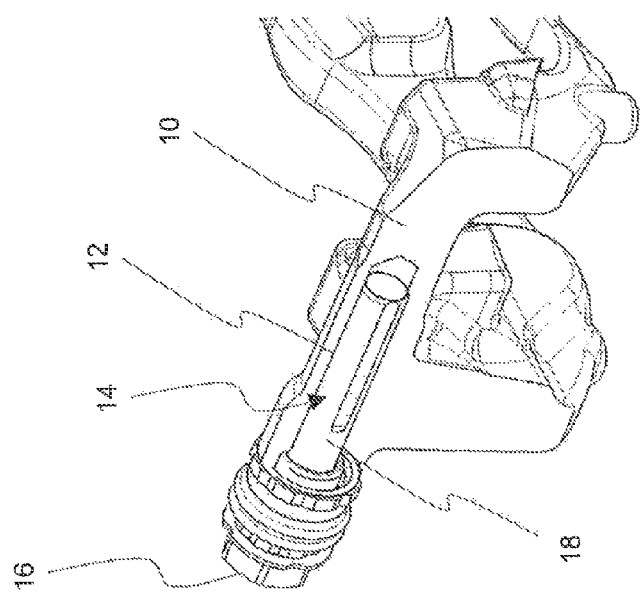

BOLT GUIDING DEVICE FOR A FLOATING CALIPER DISC BRAKE AND CORRESPONDING FLOATING CALIPER DISC BRAKE

CROSS-REFERENCE TO RELATED APPLICATIONS

This application is a national stage of International Application No. PCT/EP2012/001527 filed Apr. 5, 2012, the disclosures of which are incorporated herein by reference in entirety, and which claimed priority to German Patent Application No. DE 10 2011 017 220.3 filed Apr. 15, 2011, the disclosures of which are incorporated herein by reference in entirety.

BACKGROUND OF THE INVENTION

The present invention relates to a bolt guiding device for a floating caliper disc brake, having at least one guide bolt that is supported in a brake carrier and mounted on a brake caliper, wherein the brake caliper is movably guided over the guide bolt in the axial direction thereof, wherein the bolt guiding device is disposed between an inner circumferential surface of a location hole of the brake carrier and an outer circumferential surface of the guide bolt accommodated therein, wherein the bolt guiding device comprises a slide bush, wherein one surface of the inner circumferential surface and external circumferential surface acts as a retaining surface on which the slide bush is retained, and wherein the other surface of the inner circumferential surface and external circumferential surface acts as a sliding surface on which the slide bush slides.

Such a bolt guiding device is prior art. In this respect reference is made to the document DE 103 41 095 A1, in which a bearing sleeve that receives a slide bush is inserted into the brake caliper. The slide bush is, as it were, permanently fixed in the brake caliper. The slide bush comprises a plurality of radial grooves running in circumferential direction and surrounded in each case by guiding surfaces lying closely adjacent to a guide bolt. It has however emerged that with this arrangement, particularly if the vehicle is stationary for a prolonged period, upon actuation of the brake a relatively high static friction has to be overcome first before the brake caliper can be moved. As a consequence of this, in such a situation relatively high actuating forces have to be summoned up first in order to move the brake caliper at all in a brake-effective manner. After the static friction has been overcome, these relatively high actuating forces however lead to an unexpectedly strong braking effect. In this connection one speaks of relative high "breakaway torques". The driver may find this disturbing.

The document DE 10 2006 053 183 A1, and corresponding U.S. Pat. No. 8,220,596 B2, both of which are incorporated by reference herein in entirety, describes a solution whereby a slide bush of similar design is mounted directly on the guide bolt. This slide bush, instead of a radial groove extending in circumferential direction, has a series of grooves in the shape of a section of a helix, between which sliding surfaces likewise in the shape of a section of a helix are disposed. This solution similarly has the drawback of relatively large guiding surfaces which, if a vehicle has not been used for a prolonged period, then leads to the previously described high breakaway torques with the disadvantageous effect of unexpectedly strong braking effects.

The document DE 10 2007 053 902 A1, and corresponding US patent publication number 2010/282547 A1, both of which are incorporated by reference herein in entirety, further describes a solution whereby, instead of grooves in the shape of a section of a helix, axial grooves are provided. Between these axial grooves guiding surfaces likewise extending in axial direction are provided. This solution also leads to relatively high static friction forces that entail the described disadvantageous effect of high breakaway torques.

As further prior art, reference is made to the documents DE 100 04 178 A1, WO 2005/1241179 A1, WO 2004/038249 A1 and DE 102 45 027 A1. In these documents use is made i.a. of multipart guide bodies or guide bodies in the form of spring elements, which because of their complexity lead to arrangements that are relatively cost-intensive and hence rather less attractive for mass production.

BRIEF SUMMARY OF THE INVENTION

A feature of the present invention is to provide a bolt guiding device for a floating caliper disc brake of the type described in the introduction as well as a floating caliper disc brake configured with such a bolt guiding device, which while being of a simple and economical construction effectively combat the previously described problem of high breakaway torques.

This feature is achieved by a bolt guiding device, in which it is provided that the slide bush has, facing the sliding surface, at least one guiding surface on each side of the centre of the slide bush and at least one intermediate surface extending in the circumferential direction on each side of the centre of the slide bush, wherein the diameter of the at least one guiding surface is dimensioned in such a way that said guiding surface is in close contact with the sliding surface, and wherein the diameter of the intermediate surface is dimensioned in such a way that said intermediate surface is provided in direct contact with or with a slight radial spacing from the sliding surface.

In order to avoid correspondingly high breakaway torques the present invention provides that the actual guiding surface that actively guides in a normal mode of operation is kept small and is adjoined in each case in the direction of the centre of the slide bush by at least one intermediate surface extending in circumferential direction. In terms of level, such intermediate surfaces are positioned "lower" than the guiding surfaces, i.e. the intermediate surfaces are set back in terms of the sliding surface relative to the guiding surfaces. In this case it is provided that the diameter of the intermediate surfaces is dimensioned in such a way that said intermediate surface is provided in direct contact with or with a slight radial spacing from the sliding surface. The intermediate surfaces are provided for the purpose of providing supplementary support and guidance if the arrangement is subjected to high forces and the small-dimensioned guiding surfaces are extremely deformed under these forces. In such an operating situation the intermediate surfaces act supportively in addition to the guiding surfaces. The additional supportive effect via the intermediate surfaces therefore reliably prevents an unwanted contact and guidance via the metal surface of the bolt and the metal surface of the location hole in the brake carrier.

A development of the invention additionally provides in the slide bush at least one recess or indentation for receiving lubricants. This allows even better prevention of the previously described disadvantageous effect of high retaining forces caused by static friction that leads to the previously described unwanted high breakaway torques while the high retaining forces caused by the static friction are overcome. By providing suitable recesses or indentations for receiving lubricant on each side of the centre of the slide bush it is guaranteed that in any operating situation there is sufficient lubricant available to provide easy actuation while avoiding breakaway torques, even in the event of prolonged stoppages.

A development of the invention provides that the slide bush further has, facing the sliding surface, at least one radial groove. In this case, according to the invention it is further possible that the at least one radial groove is disposed between the guiding surfaces and the intermediate surfaces. The radial groove may offer a further grease reservoir that allows a distribution of lubricant in circumferential direction of the slide bush and hence improves the long-term lubricating capability.

A development of the invention provides that the diameter of the guiding surfaces is dimensioned in such a way that said guiding surfaces are in close contact with the sliding surface. This guarantees that a defined guidance is provided between the slide bush and the sliding surface. In particular, in this connection it may be provided that between the guiding surfaces and the sliding surface an interference fit is provided.

According to the invention it may further be provided that in the intermediate surface or/and in the guiding surface at least one recess or indentation for receiving lubricant is provided. This guarantees that the recesses or indentations do not weaken the guiding surfaces, but retain or make available lubricant in the intermediate surfaces, which as such come into effect for support and guidance purposes only in exceptional circumstances.

A development of the invention provides that the transition between the radial groove and at least one intermediate surface or/and the transition between at least one of the intermediate surfaces and at least one of the guiding surfaces is of a conical or rounded configuration. Rounded or conical transitions between the respective surfaces and the radial groove ensure an improved sliding behaviour. Furthermore, the movement between the sliding surface and the guiding surfaces is facilitated and by virtue of the gap that tapers in a wedge-shaped manner an improved lubricant feed is guaranteed.

According to the invention it may further be provided that the axial end portions of the bolt guiding device are of a conical or rounded configuration. This too facilitates a movement between the slide bush and the sliding surface that guides it. According to the invention it is further provided that the slide bush has, facing the sliding surface, at least one axial groove extending in longitudinal direction. Preferably a plurality of axial grooves are provided at regular angular distances in the slide bush. These are used for venting and likewise for retaining lubricant. In particular, in this case it may be provided that the at least one axial groove together with the sliding surface delimits a clearance that is larger in radial direction than the at least one radial groove.

A development of the invention provides that the slide bush is configured for fastening to the guide bolt. Given such a configuration, the previously described contour with radial groove and guiding surfaces and optionally with intermediate surfaces and correspondingly conical or rounded transitions faces radially outwards. As an alternative to this, it may be provided that the slide bush is configured for fastening to the brake carrier in the region of the location hole. Given such a configuration, compared to the previously described form of construction the slide bush is, as it were, turned outside in so that the contour faces radially inwards. Given the last-described configuration, according to the invention it may be provided that the slide bush is formed integrally with a protective gaiter. In a modification to this, a bolt guiding device is possible, in which the slide bush is mounted likewise on the brake carrier and has, facing the sliding surface, a guiding surface on each side of the radial groove, wherein in the guiding surfaces axial openings are provided for venting.

The invention further relates to a floating caliper disc brake having a bolt guiding device of the previously described type.

Other advantages of this invention will become apparent to those skilled in the art from the following detailed description of the preferred embodiments, when read in light of the accompanying drawings.

BRIEF DESCRIPTION OF THE DRAWINGS

FIG. 5 is a view as in FIG. 1 of an alternative form of construction;

FIG. 6 is a partially cut-open view of a combined component of slide bush and gaiter for the form of construction according to FIG. 5; and FIG. 7 is the component according to FIG. 6 in a perspective general view.

DETAILED DESCRIPTION OF THE INVENTION

Figure 2:
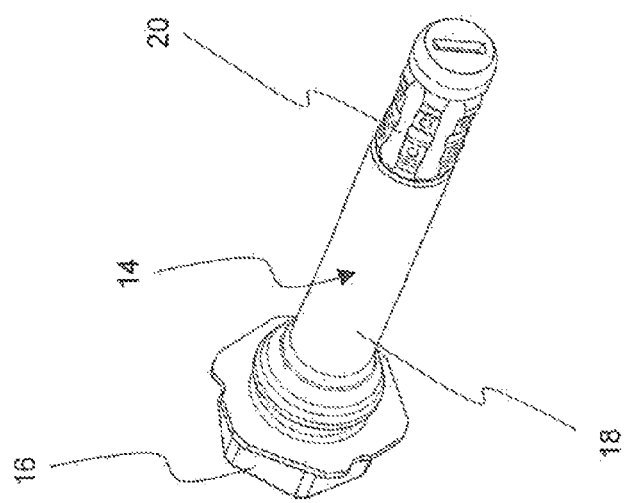
FIG. 2 is a perspective view of the guide bolt with slide bush.
Figure 1:
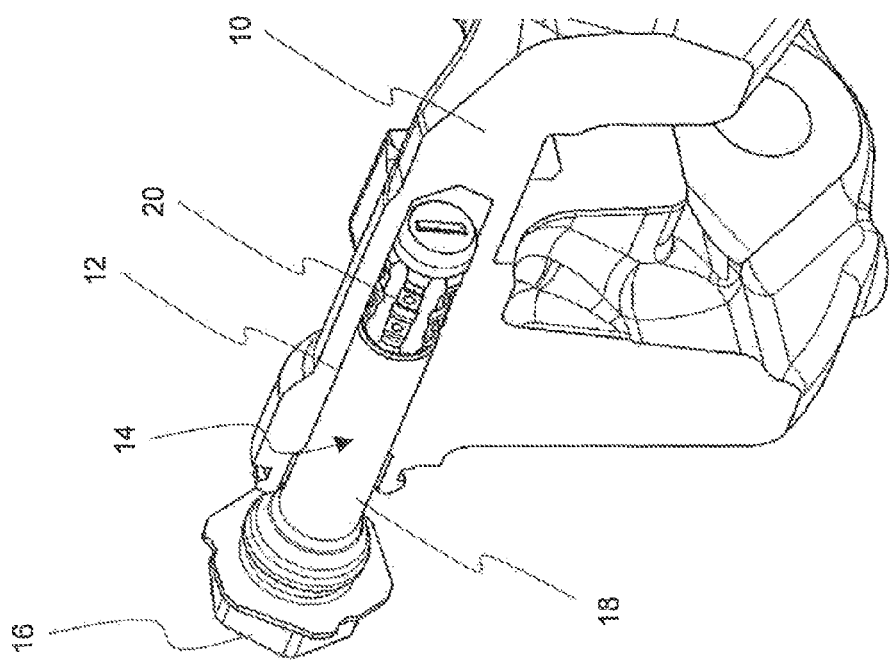
FIG. 1 is a part-sectional view representing a guide bolt that is accommodated in a brake carrier.

In FIG. 1 a brake carrier of a floating caliper brake is shown in a part-sectional view and generally denoted by 10. It comprises a location hole 12. Accommodated in the location hole 12 is a guide bolt 14, which at its—in FIG. 1 left—end has a bolt head 16, by which it is fixed to a non-illustrated brake caliper. A shank portion 18 of the guide bolt 14 projects into the location hole 12. Close to its free end the locating bolt 14 is provided with a portion, in which a slide bush 20 is accommodated. The guide bolt 14 is represented once again as a single component in an, as it were, cut-free manner in FIG. 2.

Figure 4:
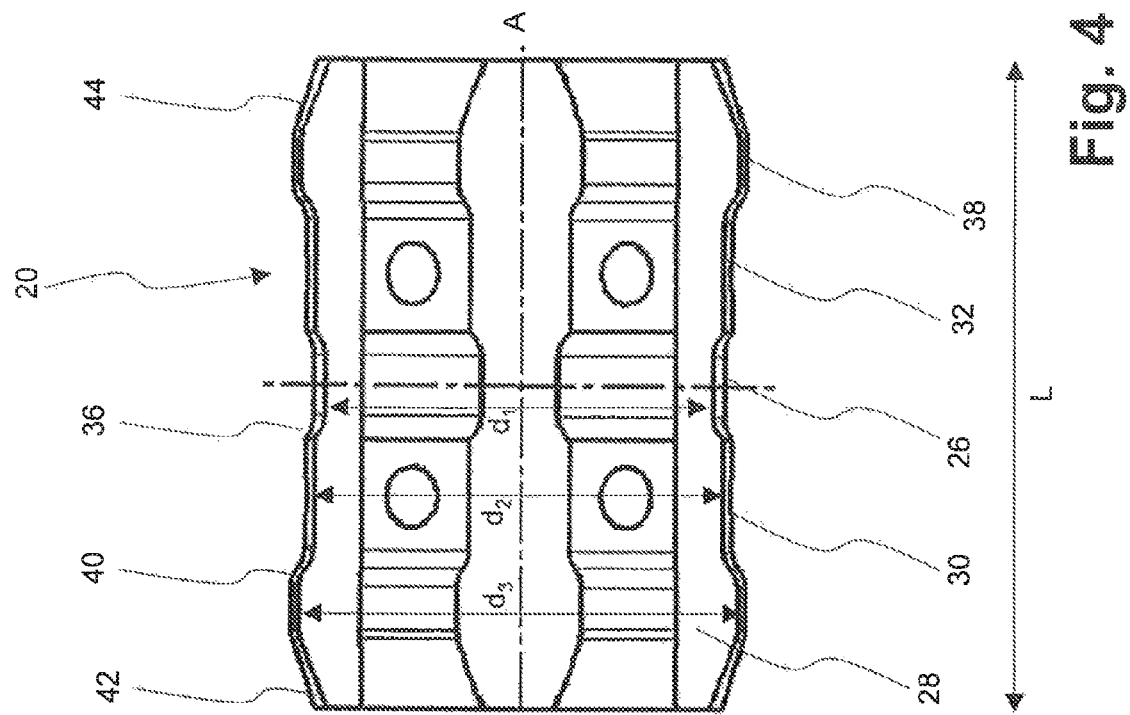
FIG. 4 is a side view of the guide bush of FIG. 3.
Figure 3:
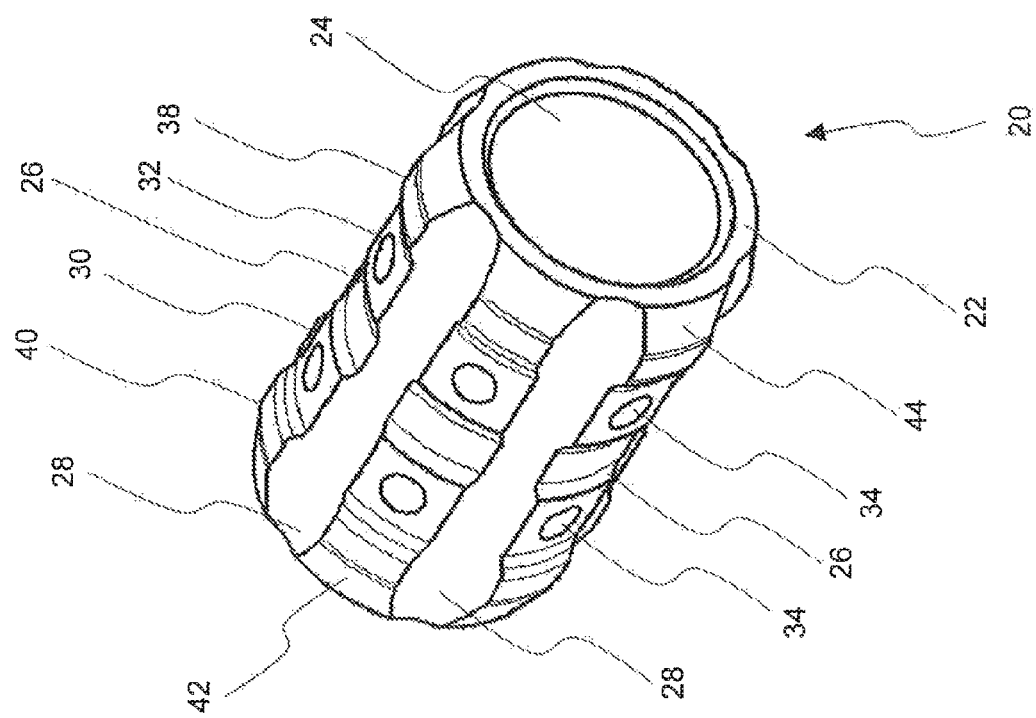
FIG. 3 is the slide bush in a single component drawing in perspective view.

In FIG. 3 the guide bush 20 may be seen in a perspective single component drawing, while being shown in side view in FIG. 4. In FIGS. 3 and 4 it may be seen that the slide bush 20 is manufactured from a tubular plastic body 22 that has a central opening 24, by means of which it may be slipped onto a portion of reduced diameter of the guide bolt 14. The slide bush 20 in its central region has a radial groove 26 extending in circumferential direction. This defines an internal diameter $d_1$. In the direction of the longitudinal axis A longitudinal grooves 28 extend in regular angular portions over the entire length L of the slide bush 20. The longitudinal grooves 28 are worked to such a depth into the slide bush 20 that they have a greater depth than the radial groove 26 extending in circumferential direction.

Extending on each side of the radial groove 26 are intermediate surfaces 30 and 32. These have radial indentations 34, which are provided for receiving lubricant. The intermediate surfaces 30, 32 define portions having a diameter $d_2$. The transition from the radial groove 26 to the intermediate surfaces 30 and/or 32 runs via rounded and/or conical portions 36. Further in the direction of the axial end portions the intermediate surfaces 30, 32 are adjoined by guiding surfaces 38, 40. These guiding surfaces 38, 40 define the maximum external diameter $d_3$ of the slide bush 20, which diameter is greater than the diameter $d_2$ defined by the intermediate surfaces 30, 32. The transition between the intermediate surfaces 30, 32 and the guiding surfaces 38, 40 likewise has a rounded shape with corresponding rounded portions 42 or a conical shape. Axially outside each of the guiding surfaces 38, 40 the slide bush 20 tapers conically, being provided with corresponding conical portions 42, 44.

The mode of operation of the slide bush 20 in the installed state, as shown in FIG. 1, is as follows. The location hole 12 of the brake carrier 10 is configured as a guiding surface and/or sliding surface. It is configured so that the slide bush 20 slides on it. Provided in the location hole 12 is lubricant, which adheres in the radial groove 26, the axial grooves 28, the indentations 34 and also in the region of the intermediate surfaces 30, 32. The axial grooves 28 serve as vent bores in order to directly counteract pressure fluctuations in the regions on either side of the slide bush 20.

During normal operation the slide bush 20 slides by means of its guiding surfaces 38 and 40 along the sliding surface of the location hole 12. In so doing, because of the various regions for collecting lubricant there is always sufficient lubricant available to enable a sliding motion even after the vehicle has been stationary for a prolonged period. Despite the relatively limited contact surfaces between the location hole 12 and the sliding bush 20 an adequately good support—and guidance effect may be achieved. High breakaway torques, such as were described in the introduction with reference to the prior art, may therefore be effectively avoided. In the event of relatively high transverse forces, which lead to an extreme deformation of the guiding surfaces 38, 40, the intermediate surfaces 30, 32 come into supportive action and provisionally ensure a relatively large-area support and guidance of the slide bush 20 in the location hole 12. As a result, any destruction of the guiding surfaces 38 because of extreme deformation caused by correspondingly high forces may be avoided. The intermediate surfaces 30, 32 act, as it were, as a protection device, wherein their guiding contact with the location hole 12 occurs with a high incorporation of lubricant owing to the recesses 34 provided on the intermediate surfaces 32, 34.

It should be mentioned that the external diameter $d_3$ in the region of the guiding surfaces 38, 40 is dimensioned in such a way that said guiding surfaces are inserted with interference into the location hole 12 and hence fit tightly in the location hole 12. As a result, reliable contact is guaranteed for the conventional mode of operation. Nevertheless, in the event of a braking operation, a displacement of the brake caliper is achievable without overmuch resistance, not least also because of the permanently available lubricant retained in the region of the slide bush 20. Both high breakaway torques, which occur in particular after a prolonged stationary state of the vehicle, and the slip-stick effects, which arise with sliding friction in the prior art, i.e. a jolting or jerky movement of the brake caliper and the guide bolt 14 mounted thereon, may be effectively avoided with such a structure.

The intermediate surfaces 30, 32, by means of which a supportive effect is deployed in the event of extreme loading by corresponding transverse forces or tilting forces, also prevent any guiding contact from occurring between the metal portions of the guide bolt 14 and the location hole 12. It should additionally be mentioned that the rounded or conical transitions 36, 42 provide a wedge-gap effect and an adequate, but not excessive supply of lubricant to the guiding surfaces 38, 40.

Overall, the illustrated structure of the slide bush 20 offers a variety of advantages for guidance of the brake caliper without providing complex multipart arrangements of the type known from the background art.

As an alternative, non-illustrated form of construction it is also possible for a slide bush having a contour corresponding to the contour of the slide bush 20, as represented in particular in FIGS. 3 and 4, to be, as it were, turned outside in and for the slide bush to be configured in such a way that its contour faces radially inwards. This would mean that a slide bush turned outside in in this way is fixed permanently to the brake carrier 10 in a corresponding receiver and the sliding surface would be formed by the guide bolt 14. As regards the guiding contour with the corresponding axial grooves and the radial groove, however, nothing would then change. Given a slide bush turned outside in in this way, the guiding surfaces would project to a corresponding extent radially inwards and would have the smallest diameter, followed by the diameter of the intermediate surfaces disposed radially further outwards, and the largest diameter in the region of the circumferential groove.

FIGS. 5 to 7 show a similar arrangement, in which the guide bolt 14 is guided in a slide bush 50 that is mounted directly on the brake carrier 10. The slide bush 50 is formed integrally with a protective gaiter 52, which is latchable by means of corresponding detent means 54, 56 at one end to the brake carrier 10 and at the other end to the brake caliper or the guide bolt 14.

The slide bush 50 is accommodated in a corresponding portion of enlarged diameter 58 in the brake carrier 10. It has an inner circumferential surface with an axial groove 60, which extends in circumferential direction and on either side of which two radially inward projecting guide ribs 62, 64 are disposed. These are locally interrupted by axial grooves 66 in order to provide pressure relief. In the radial groove extending in circumferential direction lubricant collects, which may flow through the rounded transitions from the axial groove 60 to the guiding surfaces of the guide ribs 62, 64.

With the arrangement according to FIGS. 5 to 7 it is also possible extensively to achieve a corresponding mode of operation, such as is described above.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A bolt guiding device for a floating caliper disc brake, the floating caliper disc brake having at least one guide bolt that is configured to be supported in a brake carrier and mounted on a brake caliper, wherein the brake caliper is configured to be movably guided relative to the guide bolt in an axial direction of the guide bolt, wherein the bolt guiding device is configured to be disposed between an inner circumferential surface of a location hole of the brake carrier and an outer circumferential surface of the guide bolt accommodated therein, wherein the bolt guiding device comprises a slide bush, wherein one surface of the inner circumferential surface and outer circumferential surface is configured to act as a retaining surface on which the slide bush is retained, and wherein the other surface of the inner circumferential surface and outer circumferential surface is configured to act as a sliding surface on which the slide bush slides;

wherein the slide bush is configured to have, facing the sliding surface:
at least one guiding surface on each side of a center of the slide bush, wherein the center of the slide bush extends transversely to a longitudinal axis of the slide bush; and
at least one intermediate surface extending in a circumferential direction of the slide bush on each side of the center of the slide bush;

wherein respective diameters of the guiding surfaces are dimensioned in such a way that the guiding surfaces are configured to contact the sliding surface;

wherein respective diameters of the intermediate surfaces are dimensioned in such a way that the intermediate surfaces are configured to contact or are configured to have a slight radial spacing from the sliding surface, wherein the respective diameters of the intermediate surfaces are:
(1) less than the respective diameters of the guiding surfaces when the guiding surfaces and the intermediate surfaces are configured to face the inner circumferential surface, such that the intermediate surfaces only come into supportive action with the sliding surface in the event of a deformation of the guiding surfaces; or
(2) greater than the respective diameters of the guiding surfaces when the intermediate surfaces and guiding surfaces are configured to face the outer circumferential surface, such that the intermediate surfaces only come into supportive action with the sliding surface in the event of a deformation of the guiding surfaces;

wherein provided in at least one of the intermediate surfaces is at least one recess or indentation for receiving lubricant, and wherein the at least one recess or indentation is fully surrounded by a respective one of the intermediate surfaces.

2. The bolt guiding device according to claim 1, wherein the guiding surfaces are configured to form an interference fit with the sliding surface.

3. The bolt guiding device according to claim 1, wherein the intermediate surfaces directly adjoin the guiding surface.

4. The bolt guiding device according to claim 1, wherein provided in the guiding surfaces is at least one recess or indentation for receiving lubricant.

5. The bolt guiding device according to claim 1, wherein the slide bush further has at least one radial groove configured to face the sliding surface.

6. The bolt guiding device according to claim 5, wherein the at least one radial groove is disposed between the guiding surfaces and the intermediate surfaces.

7. The bolt guiding device according to claim 5, wherein a transition between the at least one radial groove and at least one of the intermediate surfaces or/and a transition between at least one of the intermediate surfaces and at least one of the guiding surfaces is of a conical or rounded configuration.

8. The bolt guiding device according to claim 1, wherein axial end portions of the slide bush are of a conical or rounded configuration.

9. The bolt guiding device according to claim 5, wherein the slide bush has at least one axial groove extending in longitudinal direction and configured to face the sliding surface.

10. The bolt guiding device according to claim 9, wherein the at least one axial groove extends over an entire length of the slide bush.

11. The bolt guiding device according to claim 9, wherein the at least one axial groove is configured to delimit, together with the sliding surface, a clearance that is greater in a radial direction than the at least one radial groove.

12. The bolt guiding device according to claim 1, wherein the slide bush is configured for fastening to the guide bolt.

13. The bolt guiding device according to claim 1, wherein the slide bush is configured for fastening to the brake carrier.

14. The bolt guiding device according to claim 13, wherein the slide bush is formed integrally with a protective gaiter.

15. A floating caliper disc brake having at least one guide bolt that is mounted on a brake caliper and movably guided relative to a brake carrier in an axial direction of the guide bolt, wherein the floating caliper disc brake is configured with a bolt guiding device, wherein the bolt guiding device is disposed between an inner circumferential surface of a location hole of the brake carrier and an outer circumferential surface of the guide bolt accommodated therein, wherein the bolt guiding device comprises a slide bush, wherein one surface of the inner circumferential surface and outer circumferential surface acts as a retaining surface on which the slide bush is retained, and wherein the other surface of the inner circumferential surface and outer circumferential surface acts as a sliding surface on which the slide bush slides, wherein the slide bush has, facing the sliding surface:
at least one guiding surface on each side of a center of the slide bush, wherein the center of the slide bush extends transversely to a longitudinal axis of the slide bush; and
at least one intermediate surface extending in a circumferential direction of the slide bush on each side of the center of the slide bush;

wherein respective diameters of the guiding surfaces are dimensioned in such a way that the guiding surfaces contact the sliding surface;

wherein respective diameters of the intermediate surfaces are dimensioned in such a way that the intermediate surfaces contact or have a slight radial spacing from the sliding surface; and wherein the respective diameters of the intermediate surfaces are:
(1) less than the respective diameters of the guiding surfaces in an non-compressed state when the inner circumferential surface is the sliding surface, such that the intermediate surfaces only come into supportive action with the sliding surface in the event of a deformation of the guiding surfaces; or
(2) greater than the respective diameters of the guiding surfaces in a non-compressed state when the outer circumferential surface is the sliding surface, such that the intermediate surfaces only come into supportive action with the sliding surface in the event of a deformation of the guiding surfaces;

wherein provided in at least one of the intermediate surfaces is at least one recess or indentation for receiving lubricant, and wherein the at least one recess or indentation is fully surrounded by a respective one of the intermediate surfaces.

* * * * *